(12) United States Patent
Sekiguchi et al.

(10) Patent No.: US 12,718,691 B2
(45) Date of Patent: Aug. 25, 2026

(54) VEHICLE OBJECT DETECTION SYSTEM AND METHOD FOR DETECTING A TARGET OBJECT IN A DETECTION AREA LOCATED BEHIND AND LATERAL OF A SUBJECT VEHICLE

(71) Applicants: AUMOVIO Autonomous Mobility Germany GmbH, Ingolstadt (DE); TOYOTA JIDOSHA KABUSHIKI KAISHA, Toyota (JP)

(72) Inventors: Shoichi Sekiguchi, Singapore (SG); Yusuke Ishimatsu, Toyota (JP); Takashi Unigame, Toyota (JP); Issei Matsunaga, Toyota (JP)

(73) Assignees: AUMOVIO Autonomous Mobility Germany GmbH, Ingolstadt (DE); TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 18/483,811

(22) Filed: Oct. 10, 2023

(65) Prior Publication Data

US 2024/0135823 A1 Apr. 25, 2024
US 2024/0233548 A9 Jul. 11, 2024

(30) Foreign Application Priority Data

Oct. 19, 2022 (EP) .................................... 22202613

(51) Int. Cl.

| | |
|---|---|
| ***G08G 1/16*** | (2006.01) |
| ***B60Q 9/00*** | (2006.01) |
| ***G01S 13/931*** | (2020.01) |

(52) U.S. Cl.
CPC ............ *G08G 1/166* (2013.01); *B60Q 9/008* (2013.01); *G01S 13/931* (2013.01); *B60W 2420/408* (2024.01); *B60W 2554/80* (2020.02)

(58) Field of Classification Search
CPC ........ G08G 1/166; G08G 1/167; B60Q 9/008; G01S 13/931; G01S 2013/93272; B60W 2420/408; B60W 2554/80
See application file for complete search history.

(56) References Cited

U.S. PATENT DOCUMENTS

2009/0045928 A1 2/2009 Rao et al.
2012/0262284 A1* 10/2012 Irrgang ................ B60W 50/14 340/435

(Continued)

FOREIGN PATENT DOCUMENTS

| | | |
|---|---|---|
| JP | 2018-79846 A | 5/2018 |
| JP | 2022-61388 A | 4/2022 |
| WO | 2018/045055 A1 | 3/2018 |

OTHER PUBLICATIONS

Japanese Office Action dated Nov. 26, 2024 in Application No. 2023-175386.

(Continued)

*Primary Examiner* — Tarek Elarabi
(74) *Attorney, Agent, or Firm* — Sughrue Mion, PLLC

(57) ABSTRACT

A vehicle object detection system configured to generate a judgement on whether a target object which has been detected in the detection area is an alert object, and to output the judgement to a warning which is configured to output a warning to a driver of the subject vehicle based on the judgement indicating that the target object is an alert object, wherein system is configured to generate the judgement based on at least one of a comparison of a difference between a relative speed of the target object with respect to the subject vehicle and an absolute speed of the target object in a transverse direction of the subject vehicle with a specified range, and a comparison of an estimated arrival (Continued)

position of the target object, which is a position the target object is estimated to reach in the detection area in a specific period of time.

14 Claims, 3 Drawing Sheets

(56) References Cited

U.S. PATENT DOCUMENTS

2016/0039410 A1* 2/2016 Kaminade ................ B60Q 1/46 701/1
2016/0291145 A1* 10/2016 Zeng ....................... G01S 7/415
2016/0291149 A1* 10/2016 Zeng ..................... G01S 13/874

OTHER PUBLICATIONS

Seong-Geun Shin et al, "Adaptive AEB Control Strategy for Collision Avoidance Including Rear Vehicles", Intelligent Transportation Systems Conference. 2019, IEEE, pp. 2872-2878 (8 pages total).
Office Action issued Mar. 25, 2025 in Japanese Application No. 2023-175386.

* cited by examiner

VEHICLE OBJECT DETECTION SYSTEM AND METHOD FOR DETECTING A TARGET OBJECT IN A DETECTION AREA LOCATED BEHIND AND LATERAL OF A SUBJECT VEHICLE

TECHNICAL FIELD

The invention relates to a vehicle object detection system, preferably a rear-cross traffic detection system, for detecting a target object like a vehicle (also referred to as "target vehicle" below) in a detection area located behind and/or lateral of a subject vehicle.

Furthermore, the invention relates to a computer-implemented method for detecting a target object like a target vehicle in a detection area located behind and/or lateral of a subject vehicle, particularly for controlling such a vehicle object detection system.

Moreover, the invention relates to a driver assistance system for a vehicle, comprising such a vehicle object detection system, a corresponding computer program for carrying out the computer-implemented method and a respective non-transitory computer-readable medium.

BACKGROUND

Conventional Driver Assistance Systems or Advanced Driver Assistance Systems (ADAS) for vehicles are widely used, for example, in connection with conventional vehicles as well as autonomous vehicles, and usually comprise such vehicle object detection systems.

Many vehicle accidents are caused by human error, which might have been avoided by means of such Advanced Driver Assistance Systems. Commonly known safety-critical ADAS applications include pedestrian detection/avoidance, lane departure warning/correction, traffic sign recognition, automatic emergency braking, (rear-)-cross-traffic alert and blind spot detection (BSD), for example.

In connection with (rear-)-cross-traffic alert, the respective rear cross traffic alert (RCTA) system often uses the same detecting means like a radar infrastructure as the one used for detecting vehicles in the blind spot (BSD).

For example, long range radars/long range radar sensors are usually used for applications like emergency brake assist and adaptive cruise control, while short-range-radars are often employed in connection with applications like blind spot detection (BSD), rear-cross-traffic-alert, lane-change-assist and rear pre-crash systems, for example.

In connection with (rear-)-cross-traffic alert, the conventional rear cross traffic alert (RCTA) systems use the radar infrastructure like radar sensors for detecting vehicles or objects in the blind spot (Blind Spot Detection, BSD) and can help to avoid accidents when reversing out of a parking space, i.e. when the subject vehicle moves backward.

In case of a possible collision or a danger situation, a rear traffic approaching notification (RTAN) may be output by the ROTA system to a driver of the subject vehicle by means of a visual or acoustic indicator, which notification is usually output by a Rear Approaching Target Notification System (RTAN system) implemented by the vehicle object detection system.

However, there is the problem that such systems provide a function that determines the possibility of a collision or a dangerous situation between the subject vehicle moving backward and a target object located behind and/or lateral of the subject vehicle, i.e. approaching from a side of and behind the subject vehicle, based on a so-called Time To Collision (TTC) and a crossing prediction for a collision danger area. Thus, a warning is output, even if the target object is far away from the subject vehicle and, therefore, the warning output is not necessary in some cases. That is, a warning is activated and output for warning a driver of the subject vehicle against an approaching moving object/target object which is far away and does not pose a danger to the subject vehicle.

SUMMARY OF THE INVENTION

A vehicle object detection system according to the invention is preferably a rear-cross traffic detection system and is for detecting a target object in a detection area located behind and/or lateral of a subject vehicle, the vehicle object detection system comprising: judging means configured to generate a judgement on whether a target object (like a target vehicle) which has been detected in the detection area is an alert object, and to output the judgement to warning means. The warning means is configured to output a warning to a driver of the subject vehicle based on the judgement indicating that the target object is an alert object. The judging means is further configured to generate the judgement based on at least one of

- a comparison of a difference between a relative speed of the target object with respect to the subject vehicle and an absolute speed of the target object in a transverse direction of the subject vehicle with a specified range, and
- a comparison of an estimated arrival position of the target object, which is a position the target object is estimated to reach in the detection area in a specific period of time, calculated by taking into account a present position of the target object and one or more motion parameters of the target object, in a longitudinal direction of the subject vehicle with a specified position. The specified position is preferably a fixed position with respect to the subject vehicle, i.e. being in a fixed distance to the subject vehicle in the longitudinal direction of the subject vehicle.

For example, such motion parameters which may be detected by various conventional sensors of the target object are a change of current position and a respective moving direction of the target object, a velocity and an acceleration of the target object. Additionally, also the motion parameters of the subject vehicle have to be taken into consideration, when, for example, the subject vehicle moves backward.

In this connection, the vehicle object detection system according to the invention may be further modified in such a manner that the judging means is configured to generate the judgement on whether the target object which has been detected in the detection area is an alert object, in response to the subject vehicle being detected to move backward.

Accordingly, by means of the invention, it is possible to judge/classify a target object/target vehicle to be a "far object" so that no alarm/warning will be triggered, when the subject vehicle is moving backward and if the following conditions are met:

- the difference between the relative speed of the target object with respect to the subject vehicle and the absolute speed of the target object in the Y-axis direction (of the conventional vehicle coordinate system) or subject vehicle transverse direction is within the specified range,
- the estimated arrival position of the target object in the X-axis direction (of the conventional vehicle coordinate system) or longitudinal direction of the subject vehicle is farther away than the specified position, and target object is in a specified area.

Accordingly, object detection can be continued as usual but an alarm or warning can be suppressed in a specific situation when the above conditions are all fulfilled.

Therefore, one advantageous effect achieved by the invention is to avoid unnecessary alarm warnings/activations.

The vehicle object detection system according to the invention can be further configured in such a way that the judging means is configured to determine that the target object is not an alert object, in response to the difference between the relative speed of the target object with respect to the subject vehicle and the absolute speed of the target object in the transverse direction of the subject vehicle to be within the specified range.

Moreover, the vehicle object detection system according to the invention can be further modified in such a way that the judging means is configured to determine that the target object is not an alert object, in response to the estimated arrival position being farther away from the subject vehicle with respect to the longitudinal direction of the subject vehicle than the specified position with respect to the longitudinal direction of the subject vehicle.

Furthermore, the vehicle object detection system according to the invention can be further realized in such a way that the judging means is configured to determine that the target object is not an alert object, in response to a currently detected position of the target object with respect to the subject vehicle being within a specified area, being an area behind the subject vehicle and being located at a predetermined distance, in the longitudinal direction of the subject vehicle, from the subject vehicle and included in the detection area.

Accordingly, the vehicle object detection system according to the invention can be configured in such a way that the judging means is configured to, based on the subject vehicle moving backward, generate the judgement indicating that the target object is not an alert object based on at least two conditions of a plurality of conditions (secondary conditions) being satisfied, the plurality of conditions comprising (i) the difference between the relative speed of the target object with respect to the subject vehicle and the absolute speed of the target object in the transverse direction of the subject vehicle to be within the specified range, (ii) the estimated arrival position being farther away from the subject vehicle with respect to the longitudinal direction of the subject vehicle than the specified position with respect to the longitudinal direction of the subject vehicle, and (iii) a currently detected position of the target object with respect to the subject vehicle being within a specified area, being an area behind the subject vehicle and being located at a predetermined distance, in the longitudinal direction of the subject vehicle, from the subject vehicle and included in the detection area.

Thus, a false alert (FA), i.e. an unnecessary warning output, can be suppressed when the subject vehicle is turning backward and the above conditions (secondary conditions) are satisfied.

Moreover, the vehicle object detection system according to the invention can be further configured in such a way that the judging means is configured to, based on the subject vehicle moving backward, judge whether a candidate object detected in the detection area is a candidate. This candidate is considered as target object used for the judgment of whether the target object is an alert object by evaluating the following primary conditions:

the object detected in the detection area is approaching the subject vehicle, while the subject vehicle is moving backward, and/or an estimated time of collision between the subject vehicle and the object detected in the detection area is less than a specified time.

Preferably, the primary conditions are evaluated before the secondary conditions.

Furthermore, the vehicle object detection system according to the invention can be further modified in such a way that the judging means is configured to output the judgement to the warning means which judgement indicates to the warning means not to output a warning even if a target object has been detected, based on the judging means generating the judgement indicating that the target object is not an alert object.

A driver assistance system according to the invention is for a subject vehicle and comprises detecting means configured to detect a target object in a detection area located behind and/or lateral of the subject vehicle, a vehicle object detection system according to the invention as outlined above, and warning means configured to warn a driver of the subject vehicle that a target object is present in the detection area based on the judging means of the vehicle object detection system generating the judgement indicating that the target object is an alert object.

Preferable, the driver assistance system according to the invention can be further configured in such a way that the detecting means comprises at least two sensors, preferably at least two radar sensors, like two short range radar sensors, configured to detect a target object in the detection area. Preferably, the short range radar sensors are millimeter wave radar sensors (mmWave radar sensors).

A vehicle according to the invention is preferably an autonomous vehicle and comprises a driver assistance system according to the invention as outlined above, wherein the one sensor is located at a left rear edge/region of the vehicle and the other sensor is located at a right rear edge/region of the vehicle.

A computer-implemented method according to the invention is for detecting a target object in a detection area located behind and/or lateral of a subject vehicle, particularly for controlling a vehicle object detection system according to the invention as outlined above, wherein the method comprises the following steps:

generating a judgement on whether a target object which has been detected in the detection area is an alert object, and outputting the judgement to warning means which is configured to output a warning to a driver of the subject vehicle based on the judgement indicating that the target object is an alert object, wherein the judgement is generated based on at least one of a comparison of a difference between a relative speed of the target object with respect to the subject vehicle and an absolute speed of the target object in a transverse direction of the subject vehicle with a specified range, and a comparison of an estimated arrival position of the target object, which is a position the target object is estimated to reach in the detection area in a specific period of time, calculated by taking into account a present position of the target object and one or more motion parameters of the target object, in a longitudinal direction of the subject vehicle with a specified position.

Accordingly, the properties and advantages explained in connection with the vehicle object detection system according to the invention arise in the same or similar manner in respect of the method for detecting a target object in a detection area located behind a subject vehicle according to the present invention, which is why, in order to avoid repetitions, reference is made to the respective explanations with respect to the vehicle object detection system according to the invention.

A computer program according to the invention comprises instructions which, when the program is executed by a computer or a processor, cause the computer or processor to carry out the above-mentioned method according to the invention.

A non-transitory computer-readable medium according to the invention has stored thereon the above-mentioned computer program according to the invention.

BRIEF DESCRIPTION OF THE DRAWINGS

Preferred embodiments and advantages of the invention will become more apparent upon reading the following detailed description along with the accompanying drawings in which.

DETAILED DESCRIPTION

In this context, the vehicle object detection system as described in this description may include a memory which is for example used in the processing carried out in the vehicle object detection system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the vehicle object detection system as described in this description may include a processor or a "circuit". A "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

With reference to the drawings, one preferred embodiment of the present invention will now be specifically described for illustrative purposes. It is to be understood that components or elements in this embodiment will be shown and described by way of examples only, but are not intended to limit this invention to them.

Figure 1:
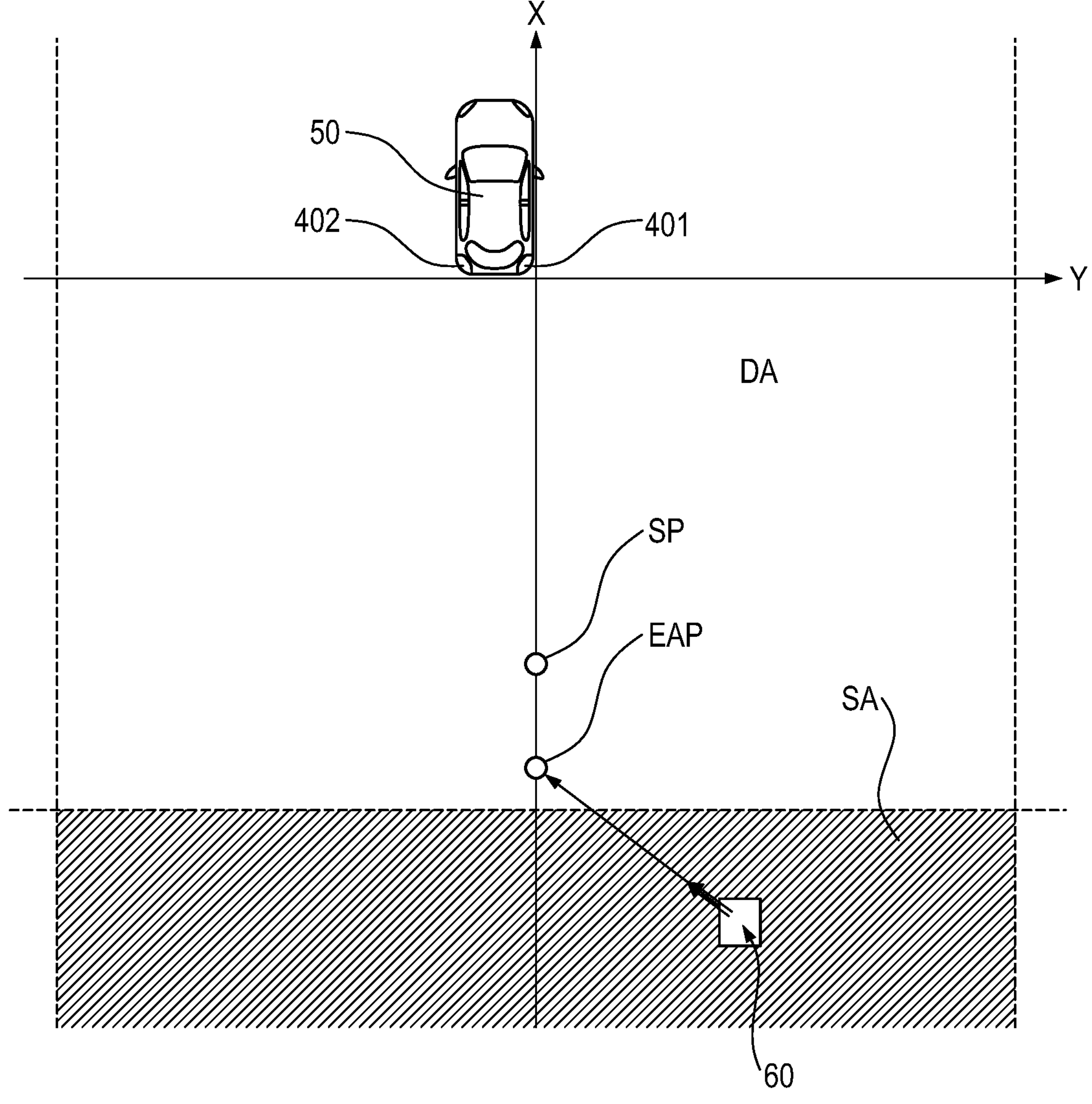
FIG. 1 shows one embodiment of a vehicle according to the invention provided with a driver assistance system according to the invention in a concrete backward driving situation.

FIG. 1 shows one embodiment of a vehicle 50 according to the invention provided with a driver assistance system 1 according to the invention in a concrete backward driving situation, which driver assistance system 1 will be described in more concrete terms in connection with FIG. 3.

Figure 3:
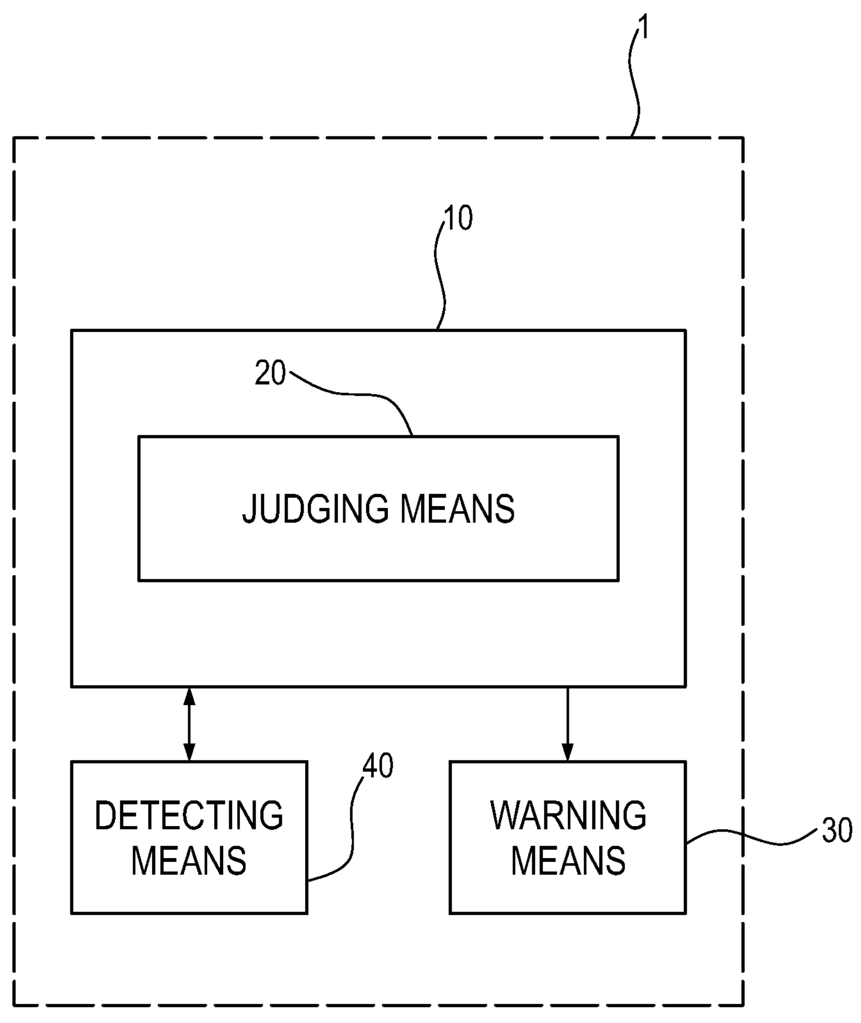
FIG. 3 shows a schematic configuration of the driver assistance system according to the invention of FIG. 1 in more detail.

FIG. 3 shows a schematic configuration of the driver assistance system 1 according to the invention of FIG. 1 in more detail.

As can be gathered from FIG. 3, the driver assistance system 1 provided in the subject vehicle 50 comprises a vehicle object detection system 10 according to the invention, detecting means 40 and warning means 30.

The detecting means 40 is configured to detect a target object 60 like another vehicle (target vehicle) in a detection area DA located behind and lateral of the subject vehicle 50 and will be described in more concrete terms below.

In this embodiment, the detecting means 40 comprises at least two sensors 401, 402 which are radar sensors, in particular two short range radar sensors configured to detect a target object 60 in the detection area DA.

In more concrete terms, the radar sensors 401, 402 may be part of a conventional (rear-)-cross-traffic alert system, for example, and are—in this specific embodiment—short range radar sensors 401, 402 which are capable of detecting at least a relative position of the target object 60 (target vehicle) and other objects with respect to the subject vehicle 50, a relative speed/velocity of the target object 60 with respect to the subject vehicle 50, an absolute velocity and acceleration of the target object 60, respectively, and so on.

Accordingly, as can be gathered from FIG. 1, the two short range radar sensors 401, 402 are each configured to detect a target object 60 in the detection area DA, wherein the one sensor 402 is located at a left rear edge/region of the vehicle 50 and the other sensor 401 is located at a right rear edge/region of the vehicle 50. Thus, each sensor 401, 402 monitors/detects, due to its field of view (FoV), a different detectable area DA included in a respective field of view of the respective sensor 401, 402 on both sides of the subject vehicle 50.

The warning means 30 is configured to warn a driver of the subject vehicle 50 that a target object 60 is present in the detection area DA. For example, the warning means 30 may be a conventional visual or acoustic indicator (display or speaker) capable of notifying the driver of the subject vehicle 50 that the target object 60 is present in the detection area DA. In this embodiment, the warning means 30 warns the driver of the subject vehicle 50 that a target object 60 is present in the detection area DA only if judging means 20 of the vehicle object detection system 10, explained below, generated the judgement indicating that the target object 60 is an alert object.

The vehicle object detection system 10 is for detecting or processing of detection of the target object 60 in the detection area DA located behind and lateral of the subject vehicle 50 and comprises the judging means 20 as mentioned above. The vehicle object detection system 10 may, for example, be implemented by a processor or computer, which has stored several programs for carrying out the function(s) of the judging means 20 and also conventional functions.

The judging means 20 is configured to judge or generate a judgement on whether a target object 60 which has been detected in the detection area DA is an alert object, and to output the judgement to the warning means 30. In turn, the warning means 30 is configured to output a warning to a driver of the subject vehicle 50 that a target object 60 is present in the detection area DA only if the judging means generated the judgement indicating that the target object 60 is an alert object.

At first, the judging means 20 is configured to, if the subject vehicle 50 moves backward, whether a candidate object presently detected in the detection area DA is a candidate for being considered as a target object 60 used for the further judgment whether the target object is an alert object or no alert object. Accordingly, the judging means 20 evaluates primary conditions which are that the candidate object detected in the detection area DA is approaching the subject vehicle 50, while the subject vehicle 50 is moving backward, and that an estimated time of collision between the subject vehicle 50 and the candidate object detected in the detection area DA is less then specified time.

In this embodiment, if the primary conditions are fulfilled, the judging means 20 generated the judgement, if the subject vehicle 50 is detected to move backward, on whether the target object 60 detected in the detection area DA is an alert object or not an alert object, i.e. no alert object, on the basis of whether all specific secondary first to third conditions are satisfied.

Thus, according to this embodiment, the judging means 20 generated the judgement, if all secondary conditions described below are determined to be satisfied, indicating that the target object 60 is not an alert object. In the other case, if only one of the secondary conditions is determined to be not satisfied, the judging means 20 generated the judgement indicating that the target object 60 is an alert object which triggers the output of a warning by the warning means 30.

The judgement on the secondary conditions will now be described in more detail:

The judging means 20 is configured to determine a first condition to be satisfied or not based on a comparison of a difference between a relative speed of the target object 60 with respect to the subject vehicle 50 and an absolute speed of the target object 60 in a transverse direction of the subject vehicle 50 with a specified range, being a direction in the Y axis direction as shown in FIG. 1.

In more concrete terms, the judging means 20 determines the first condition of the comparison of the difference between the relative speed of the target object 60 with respect to the subject vehicle and the absolute speed of the target object 60 in the transverse direction of the subject vehicle 50 to be satisfied if the difference is within the specified range.

Furthermore, the judging means 20 is configured to determine a second condition to be satisfied based on a comparison of an estimated arrival position EAP of the target object 60, which is a position the target object 60 is estimated to reach in the detection area DA in a specific period of time, calculated by taking into account a present position of the target object 60 and one or more motion parameters of the target object 60, in a longitudinal direction of the subject vehicle 50, with a specified position SP. In more detail, the judging means 20 determines the second condition of the comparison of the estimated arrival position EAP of the target object 60 with the specified position SP to be satisfied if the estimated arrival position EAP is farther away from the subject vehicle 50 with respect to the longitudinal direction of the subject vehicle 50 than the specified position SP with respect to the longitudinal direction of the subject vehicle 50.

Moreover, the judging means 20 is configured to determine a third condition to be satisfied if a currently detected position of the target object 60 with respect to the subject vehicle 50 is within a specified area SA, being an area behind the subject vehicle 50 and being located at a predetermined distance, in the longitudinal direction of the subject vehicle 50, from the subject vehicle 50 and included in the detection area DA, as shown in FIG. 1.

As mentioned above, if all first to third (secondary) conditions are fulfilled/satisfied, the judging means 20 generated the judgement indicating that the target object 60 is not an alert object, i.e. no alert object. In the other case, if only one of the secondary first to third conditions is determined to be not satisfied, the judging means 20 generates the judgement indicating that the target object 60 is an alert object which triggers the output of a warning by the warning means 30.

Thus, if all first to third (secondary) conditions are fulfilled/satisfied, the judging means 20 outputs a result of judgement to the warning means 30 which judgement indicates to the warning means 30 not to output a warning even if a target object 60 like a another target vehicle being far away from the subject vehicle is detected, as the judging means 20 generated the judgement indicating that the target object 60 is not an alert object.

Figure 2:
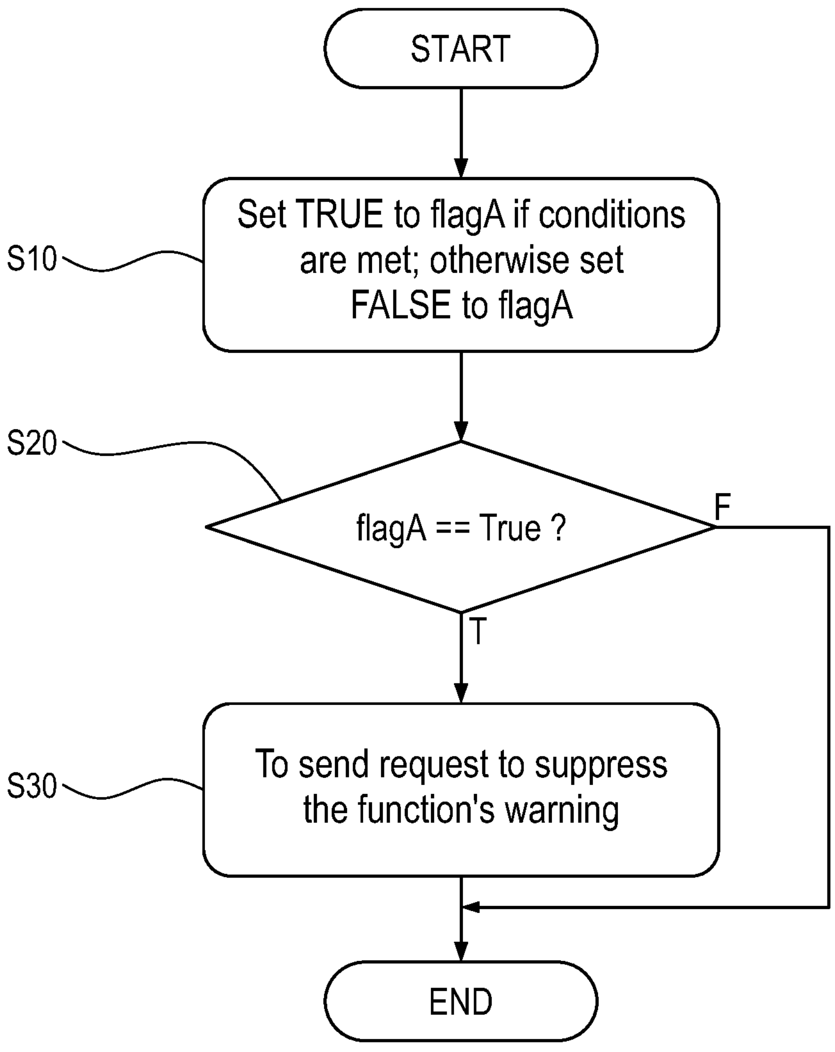
FIG. 2 shows a flowchart of a judging process carried out by the driver assistance system according to the invention of FIG. 1.

FIG. 2 shows a flowchart of a judging process carried out by the driver assistance system 1 according to the invention of FIG. 1. In more detail, the judging process as shown in FIG. 2 is carried out by the judging means 20.

When moving to step S10 of FIG. 1, a candidate object has already been detected in the detection area DA by the detecting means 40, and the judging means 20 generated the judgement, if the subject vehicle 50 moves backward, on whether the candidate object detected in the detection area DA is a candidate for being taken into consideration as a target object which is used for the judgment on whether the target object is an alert object or not an alert object by evaluating the primary conditions. These primary conditions are that the object detected in the detection area DA is approaching the subject vehicle 50, while the subject vehicle 50 is moving backward, and that an estimated time of collision between the subject vehicle 50 and the object detected in the detection area DA is less then specified time.

If these primary conditions are satisfied, the detected object is considered as a target object 60. Then, as can be seen in FIG. 2, in step 10, a data structure in the form of a flag “flagA” (alarm flag for triggering or preventing/suppressing an alarm/or warning process of the warning means 30) is either set to “True” or “False” dependent on the judgement of the judgement means 20.

In more detail, the “flagA” is set TRUE to if the judging means 20 generated the judgement indicating that the target object 60 is not an alert object when the first to third conditions as mentioned above are satisfied.

In the other case, i.e. the judging means 20 generated the judgement indicating that the target object 60 is an alert object, the “flagA” is set to FALSE. Next, the procedure moves to step S20 in which it is checked whether the “flagA” is set to TRUE. If it is set to TRUE, the procedure moves to step S30, otherwise step S30 is skipped and the procedure is ended and a warning will be output by the warning means 30 if the primary conditions are fulfilled.

In step S30, a request to suppress a warning/alarm is sent to the warning means 30, according to which it is indicated that the target object 60 is not an alert object for the time being so that no warning/alarm is output by the warning means 30 at least until next judgement.

In other words, the judging means 20 outputs the judgement to the warning means 30 which judgement indicates to the warning means 30 to suppress a warning even if a target object 60 has been detected, if the judging means 20 generated the judgement that the target object is not an alert object.

Next, one example of operation of the driver assistance system 1 provided with the vehicle object detection system 10 is described on the basis of FIG. 1.

As can be seen in FIG. 1, the subject vehicle 50 is driving backward and it is assumed that the candidate object fulfills the primary conditions so that the candidate object is considered as a target object 60 detected by the right or left rear radar sensor 401, 402 or both sensors 401, 402.

Then, the judging means 20 evaluates whether the first to third secondary conditions are satisfied.

In this case, all first to third conditions are satisfied.

That is, in more concrete terms, the difference between the relative speed of the target object 60 with respect to the subject vehicle and the absolute speed of the target object 60 in the transverse direction of the subject vehicle 50 is within the specified range (first condition), the estimated arrival position EAP is farther away from the subject vehicle 50 with respect to the longitudinal direction of the subject vehicle 50 than the specified position SP with respect to the longitudinal direction of the subject vehicle 50, and the position (currently detected position) of the target object 60 is within the specified area SA as defined above (third condition).

Accordingly, as all first to third conditions are fulfilled in this case, the judging means 20 generates the judgement indicating that the target object 60 is not an alert object so that the warning means 30 will not output a warning even if a target object 60 has been detected in the detection area DA. This is because the target object 60 detected and fulfilling all first to third conditions is considered to be an object far away from the subject vehicle 50 and causing no collision danger for the time being.

According to any of the above-mentioned embodiments, the judging means 20 may include a judging processor. The judging processor may carry out the functions of the judging means 20.

The features of the invention disclosed in the foregoing description, in the drawings as well as in the claims may be essential for the realization of the invention both individually and in any combination.

The invention claimed is:

1. A vehicle object detection system (10), for detecting a target object (60) in a detection area (DA) located behind and/or lateral of a subject vehicle (50), the vehicle object detection system (10) comprising:

judging means (20) configured to generate a judgement on whether the target object (60), which has been detected in the detection area (DA), is an alert object, and to output the judgement to warning means (30), which is configured to output a warning to a driver of the subject vehicle (50) based on the judgement indicating that the target object (60) is an alert object, wherein the judging means (20) is configured to generate the judgement in which a difference between a relative speed of the target object (60) with respect to the subject vehicle (50) and an absolute speed of the target object (60) in a transverse direction of the subject vehicle (50) is compared with a specified range;

wherein the judgment is a determination that the target object (60) is not an alert object, and the judgement suppresses outputting the warning by the warning means (30) when the target object (60) is determined to not be an alert object.

2. The vehicle object detection system according to claim 1, wherein the judging means is configured to generate the judgement on whether the target object (60) which has been detected in the detection area (DA) is an alert object, in response to the subject vehicle being detected to move backward.

3. The vehicle object detection system (10) according to claim 1, wherein the judging means (20) is configured to determine that the target object is not an alert object, in response to the difference between the relative speed of the target object (60) with respect to the subject vehicle (50) and the absolute speed of the target object (60) in the transverse direction of the subject vehicle (50) to be within the specified range.

4. The vehicle object detection system (10) according to claim 1, wherein the judging means (20) is configured to determine that the target object is not an alert object, in response to a currently detected position of the target object (60) with respect to the subject vehicle (50) being within a specified area (SA), being an area behind the subject vehicle (50) and being located at a predetermined distance, in the longitudinal direction of the subject vehicle (50), from the subject vehicle (50) and included in the detection area (DA).

5. The vehicle object detection system (10) according to claim 1, wherein the judging means (20) is configured to, based on the subject vehicle (50) moving backward, generate the judgement indicating that the target object (60) is not an alert object based on at least two conditions of a plurality of conditions being satisfied, the plurality of conditions comprising (i) the difference between the relative speed of the target object (60) with respect to the subject vehicle (50) and the absolute speed of the target object (60) in the transverse direction of the subject vehicle (50) being within the specified range, (ii) an estimated arrival position (EAP) being at a position from the subject vehicle (50) farther than a specified position (SP) from the subject vehicle (50) with respect to the longitudinal direction of the subject vehicle (50), and (iii) a currently detected position of the target object (60) with respect to the subject vehicle (50) being within a specified area (SA), being an area behind the subject vehicle (50) and being located at a predetermined distance, in the longitudinal direction of the subject vehicle (50), from the subject vehicle (50) and included in the detection area (DA).

6. The vehicle object detection system (10) according to claim 1, wherein the judging means (20) is configured to, based on the subject vehicle (50) moving backward, judge whether a candidate object detected in the detection area (DA) is a candidate for being considered as target object (60) used for the judgment of whether the target object (60) is an alert object by evaluating the following primary conditions:

the object detected in the detection area (DA) is approaching the subject vehicle, while the subject vehicle is moving backward, and/or an estimated time of collision between the subject vehicle and the object detected in the detection area (DA) is less than a specified time.

7. A driver assistance system (1) for the subject vehicle (50), comprising:

detecting means (40) configured to detect a target object (60) in a detection area (DA) located behind and/or lateral of the subject vehicle (50), a vehicle object detection system (10) according to claim 1, and warning means (30) configured to warn a driver of the subject vehicle that the target object (60) is present in the detection area (DA) based on the judging means (20) of the vehicle object detection system (10) generating the judgement indicating that the target object (60) is an alert object.

8. The driver assistance system (1) according to claim 7, wherein the detecting means (40) comprises at least two sensors (401, 402) configured to detect a target object (60) in the detection area (DA).

9. The vehicle (50) comprising the driver assistance system (1)

according to claim 7, wherein the one sensor (401) is located at a left rear edge/region of the vehicle (50) and the other sensor (402) is located at a right rear edge/region of the vehicle (50).

10. The vehicle object detection system (10) according to claim 1, wherein the judging means (20) is configured to generate the judgement based on a comparison of an estimated arrival position (EAP) of the target object (60), which is a position the target object (60) is estimated to reach in the detection area (DA) in a specific period of time, calculated by taking into account a present position of the target object (60) and one or more motion parameters of the target object (60), in a longitudinal direction of the subject vehicle (50) with a specified position (SP).

11. The vehicle object detection system (10) according to claim 10, wherein the judging means (20) is configured to determine that the target object is not an alert object, in response to the estimated arrival position (EAP) being at a position from the subject vehicle (50) farther than the specified position (SP) with respect to the longitudinal direction of the subject vehicle (50).

12. A computer-implemented method for detecting a target object (60) in a detection area (DA) located behind and/or lateral of a subject vehicle (50), comprising the following steps:

generating a judgement on whether the target object (60) which has been detected in the detection area (DA) is an alert object, and outputting the judgement to warning means (30) which is configured to output a warning to a driver of the subject vehicle (50) based on the judgement indicating that the target object (60) is an alert object, wherein the judgement is generated based on a comparison in which a difference between a relative speed of the target object (60) with respect to the subject vehicle (50) and an absolute speed of the target object (60) in a transverse direction of the subject vehicle (50) is compared with a specified range;

wherein the judgment is a determination that the target object (60) is not an alert object, and the judgement suppresses outputting the warning by the warning means (30) when the target object (60) is determined to not be an alert object.

13. A non-transitory computer-readable medium having stored thereon a computer program comprising instructions which, when the program is executed by a computer, cause the computer to carry out the computer-implemented method of claim 12.

14. The computer-implemented method for detecting the target object (60) according to claim 12, wherein the judgement further comprises a comparison in which an estimated arrival position (EAP) of the target object (60), which is a position the target object (60) is estimated to reach in the detection area (DA) in a specific period of time, calculated by taking into account a present position of the target object (60) and one or more motion parameters of the target object (60), in a longitudinal direction of the subject vehicle (50) is compared with a specified position (SP).

* * * * *